(12) United States Patent
Choudhary et al.

(10) Patent No.: US 12,013,875 B2
(45) Date of Patent: *Jun. 18, 2024

(54) READING OWN WRITES USING CONTEXT OBJECTS IN A DISTRIBUTED DATABASE

(71) Applicant: Hewlett Packard Enterprise Development LP, Houston, TX (US)

(72) Inventors: Anurag Choudhary, San Jose, CA (US); Narendra Agrawal, San Jose, CA (US); Chris Westin, San Jose, CA (US); Aditya Kishore, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 266 days.

This patent is subject to a terminal disclaimer.

(21) Appl. No.: 17/445,437

(22) Filed: Aug. 19, 2021

(65) Prior Publication Data

US 2021/0382914 A1    Dec. 9, 2021

Related U.S. Application Data

(63) Continuation of application No. 16/190,052, filed on Nov. 13, 2018, now Pat. No. 11,106,697.

(Continued)

(51) Int. Cl.
*G06F 16/27* (2019.01)
*G06F 16/22* (2019.01)
(Continued)

(52) U.S. Cl.
CPC ........ *G06F 16/273* (2019.01); *G06F 16/2282* (2019.01); *G06F 16/2358* (2019.01); *G06F 16/2477* (2019.01)

(58) Field of Classification Search
CPC ............... G06F 16/273; G06F 16/2282; G06F 16/2477; G06F 16/2358
(Continued)

(56) References Cited

U.S. PATENT DOCUMENTS 6,816,853 B1 * 11/2004 Agarwal ............. G06F 16/2471
707/999.102
7,822,711 B1 * 10/2010 Ranade ................... G06F 16/10
707/622

(Continued)

OTHER PUBLICATIONS

Kaur, Pankaj Deep, et al., "Scalable database management in cloud computing", Procedia Computer Science, vol. 70, Elsevier B. V., © 2015, pp. 658-667.*

(Continued)

*Primary Examiner* — Robert Stevens
(74) *Attorney, Agent, or Firm* — Hewlett Packard Enterprise Patent Department

(57) ABSTRACT

A context object is created when a write operation is initiated. The client application or user performs a write operation to a table and receives a context object which has information on all the tablets that are impacted by writes by the client application. The context object may contain a list describing what key ranges the client application has updated. As such, only that small portion of what has been touched needs to be looked for and this typically only includes a small subset of tablets compared to all the tablets associated with that table. This leads to a small verification cost when checking only impacted tablets in the cluster. The only portion of the table in the database that needs to be verified is the one or more portions that were updated and nothing else.

20 Claims, 3 Drawing Sheets

Related U.S. Application Data

(60) Provisional application No. 62/586,474, filed on Nov. 15, 2017.

(51) Int. Cl.
   *G06F 16/23* (2019.01)
   *G06F 16/2458* (2019.01)

(58) Field of Classification Search
   USPC .......................................................... 707/613
   See application file for complete search history.

(56) References Cited

U.S. PATENT DOCUMENTS

| | | |
|---|---|---|
| 9,100,330 B1* | 8/2015 | Noveck .................. H04L 47/283 |
| 10,324,905 B1* | 6/2019 | Ross ........................ G06F 16/23 |
| 2005/0216421 A1* | 9/2005 | Barry .................. H04L 63/0428 |
| | | 705/64 |
| 2008/0183747 A1 | 7/2008 | Mangipudi |
| 2009/0012932 A1 | 1/2009 | Romem et al. |
| 2010/0115000 A1 | 5/2010 | Youngren |
| 2014/0279855 A1* | 9/2014 | Tan ..................... G06F 16/2282 |
| | | 707/609 |
| 2018/0260287 A1* | 9/2018 | Iyer ..................... G06F 11/1464 |
| 2018/0276234 A1* | 9/2018 | Wei ..................... G06F 16/1734 |

OTHER PUBLICATIONS

Abourezq, Manar, et al., "Database-as-a-Service for Big Data: An Overview", International Journal of Advanced Computer Science and Applications, vol. 7, No. 1, 2016, pp. 157-177.*

\* cited by examiner

READING OWN WRITES USING CONTEXT OBJECTS IN A DISTRIBUTED DATABASE

PRIORITY CLAIM

This application is a continuation of U.S. patent application Ser. No. 16/190,052, filed Nov. 13, 2018 (now U.S. Pat. No. 11,106,697), which claims priority to U.S. Provisional Application No. 62/586,474, filed Nov. 15, 2017, each of which is incorporated herein by reference in its entirety.

FIELD

The invention relates to data processing. More particularly, the invention relates to reading own writes using context objects in a distributed database.

BACKGROUND

As is known, client applications make frequent queries and updates to databases which, in many current computing environments, are distributed. A table in a database may be distributed over multiple nodes, e.g. 100s of nodes.

As is known, client applications make frequent queries and updates to databases. In many current computing environments, these databases are distributed. A table in a database may be distributed over multiple nodes, e.g. 100s of nodes.

As is known in the field, a table may also have what is referred to as a secondary index. When a write is done to a table initiated by an application, the index for that table is also updated, typically to facilitate subsequent queries. In a distributed system, the index is generally updated asynchronously; this means that the write returns as soon as the table itself is updated, but before the index is confirmed to have been updated. Remote replicas of the table might be updated in a similar asynchronous fashion. Because an acknowledgement is sent to the client as soon as the table itself has been updated, but before the index and remote replicas are updated, it is possible for the client application to initiate a read to the index and remote replicas before the previous update has been applied to them.

The delay before this update is propagated to all indexes and remote replicas depends, naturally, on the size and complexity of the distributed computing system, as well as the extent that the specific table is distributed over the system. Because the index is not updated immediately, it is possible that the user who initiated the write operation and performs a read immediately on the same table does not see the write to the table if they attempt to read the table by using the index. The user may see older data when using the secondary index that has not been updated before the read occurs, but see newer data if the table is accessed directly. This can make it difficult to write programs that function correctly. Likewise, the client application may cause some other application to issue a read that may or may not use the index or the main table. If that read occurs soon after the acknowledgment of the original write, inconsistent results may also be observed by this other application as well.

In many applications, it has become increasingly important for a client application to see data that is consistent with the recent actions of the client application in the primary table and secondary index after the write is performed. No matter how quickly the write is executed, the client application must be able to guarantee that subsequent operations see the results of the write. This is presently not guaranteed or even verifiable with distributed databases. It would be preferable if the client application could verify that reads from the secondary index at any time are true and up-to-date relative to all writes done by that application.

It is not, however, acceptable to check each subdivision of a table and each subdivision of each index or remote replica to determine whether all consequences a write has completed. As noted, a distributed table is spread out among multiple nodes. A node, for example, can have computing, storage, and storage access capabilities, for instance sixteen CPUs and either disk drives or solid state drives for storage. For example, one node can store ten terabytes of data. A table is comprised of multiple subdivisions, also referred to as tablets.

Typically, a table is comprised of hundreds of tablets. Data in a table is stored in these tablets, typically organized by the primary key of the table. As noted, the time it takes to verify that a corresponding index for a tablet is up-to-date is directly proportional to the number of tablets comprising the table. Each and every one of the subdivisions that has data belonging to the table needs to be checked to see if a corresponding index has been updated for this tablet. This is a significant time consuming task.

SUMMARY

In embodiments, a context object is created when a write operation is initiated. The client application or user performs a write operation to a table and receives a context object that has information on all the tablets that are impacted by writes by the client application.

In embodiments, the context object may contain a list describing what key ranges the client application has updated. As such, only that small portion of what has been touched needs to be looked for and this typically only includes a small subset of tablets compared to all the tablets associated with that table. This leads to a small verification cost when checking only impacted tablets in the cluster. The only portion of the table in the database that needs to be verified is the one or more portions that were updated and nothing else.

DRAWINGS

DESCRIPTION

Figure 1:
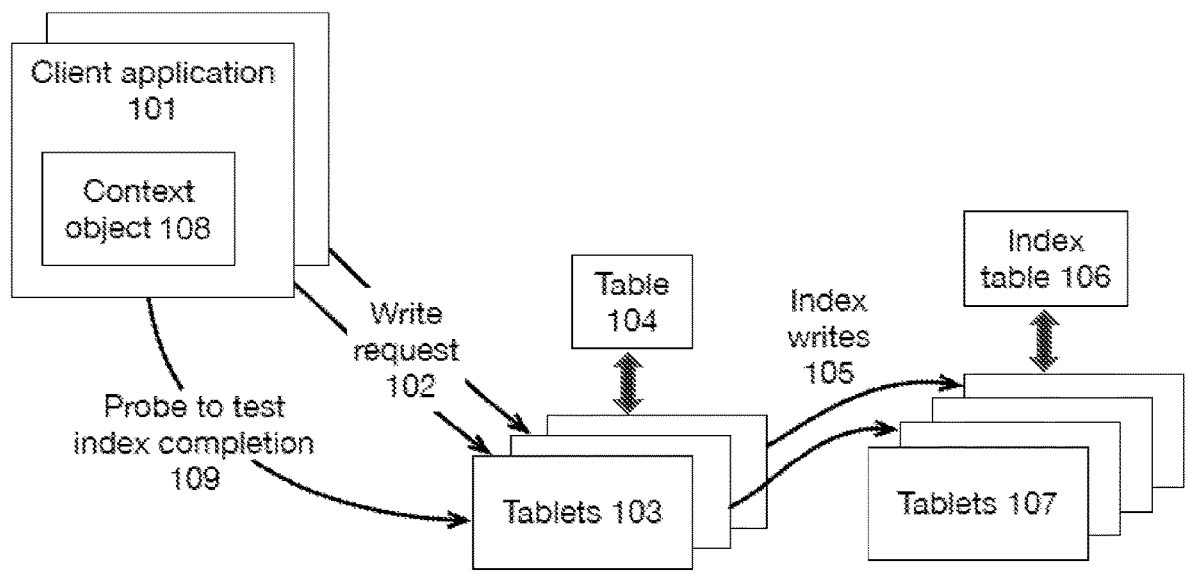
FIG. 1 is a block diagram showing a mechanism for reading own writes using context objects in a distributed database.

In embodiments, a context object is created when a write operation is done. The client application or user performs a write operation to a table by dividing the write into subsidiary writes according to the allocation of key ranges to tablets in the table and then sending each part of the write operation to the each tablet affected. From each tablet, the client application receives a context object that has information on the write operation for that tablet. Taken together, the information in the context objects returned from each tablet regarding the individual writes by the client application can be combined into a context object for the entire write operation. In many cases, of course, a write updates only a single row. In such a case, the context object for the write operation would be identical to the context object returned from the single affected tablet.

In embodiments, the context object may contain a list describing what key ranges the client application has updated. As such, only that small portion of what has been touched needs to be looked for and this typically only includes a small subset of tablets compared to all the tablets associated with that table. This leads to a small verification cost when checking only impacted tablets in the cluster. The only portion of the table in the database that needs to be verified is the one or more portions that were updated and nothing else.

The context object also contains timestamp data. The context object may contain a timestamp for the updates that is the latest timestamp of any of the updates to any tablet in the table. The context object may alternatively contain a timestamp for each key range that was updated.

Each write to table consists of writes to one or more tablets. Each tablet responds to a write operation by returning a confirmation of the write along with the timestamp associated with each write. Asynchronously, each tablet writes records to any secondary indexes and maintains the minimum timestamp of any pending secondary index writes. Because of the monotonicity of timestamps within each tablet, it is possible to determine whether any particular write has propagated successfully to the index by testing this minimum timestamp against the timestamp for the write.

When a client application reads data where the read is intended to be performed only after all indexes reflect the results of a previous write, the context object associated with that write can be used to test efficiently and possibly to wait for the completion of all indexing operations. At a minimum, the pending index timestamp for any tablets that are being queried can compared to the timestamp or timestamps in the context object. If query ranges affected by the write are retained in the context object, then the number of tablets to be queried can be reduced to the intersection of those involved in the query and those involved in the write.

The tablets can maintain independent statistical estimates of the indexing delays that they are seeing. They can combine this information with the timestamps of pending indexing operations to get an optimistic estimate of the earliest time that there is a significant probability that a particular timestamp is cleared. This estimate can be returned to the client application and used as a time to delay until the next time that the client application queries the tablet to see if all writes of interest have been indexed.

In embodiments, the contents of a context object can be passed from one client application to another. The client application that receives the context object can perform the test for index currency exactly the way that the original client application could do.

In embodiments, the contents of a context object can be returned to a web browser in the form of a cookie. This cookie can be decoded back into a context object by a Web application server and then used to verify that indexing operations have completed relative to a particular write.

In embodiments, context objects can be combined so that the indexing status of all of multiple writes can be tested in a single test. The combination would require that the union of all affected tables be kept and that the maximum of any timestamps be kept.

In this manner, the client application making the update to the table is guaranteed that an immediate subsequent read or write operation has a secondary index for the table that is true and up-to-date, reflecting the write that was just made by that user. Each subdivision or tablet in a node has its own internal structure for storing information on what data in the table has been changed and how much of that changed data has been synchronized with tables of the secondary index for that table.

FIG. 1 is a block diagram showing a mechanism for reading own writes using context objects in a distributed database.

In FIG. 1, a client application 101 makes one or more write requests 102 from any thread to tablets 103 that are associated with a table 104. The tablets 103 later perform index writes 105 to an index table 106 also composed of tables 107. The timestamps of the original changes for pending index writes are maintained so that each tablet can determine whether a write has been propagated successfully by checking a timestamp.

The tablets return one or more context objects 107 as a result of the write request 102, typically long before the index writes 105 have completed. Subsequently, the client application 101 or any other program with a copy of the context object can probe the tables to determine if the changes due to the original write request 102 have been propagated to the tables.

Figure 2:
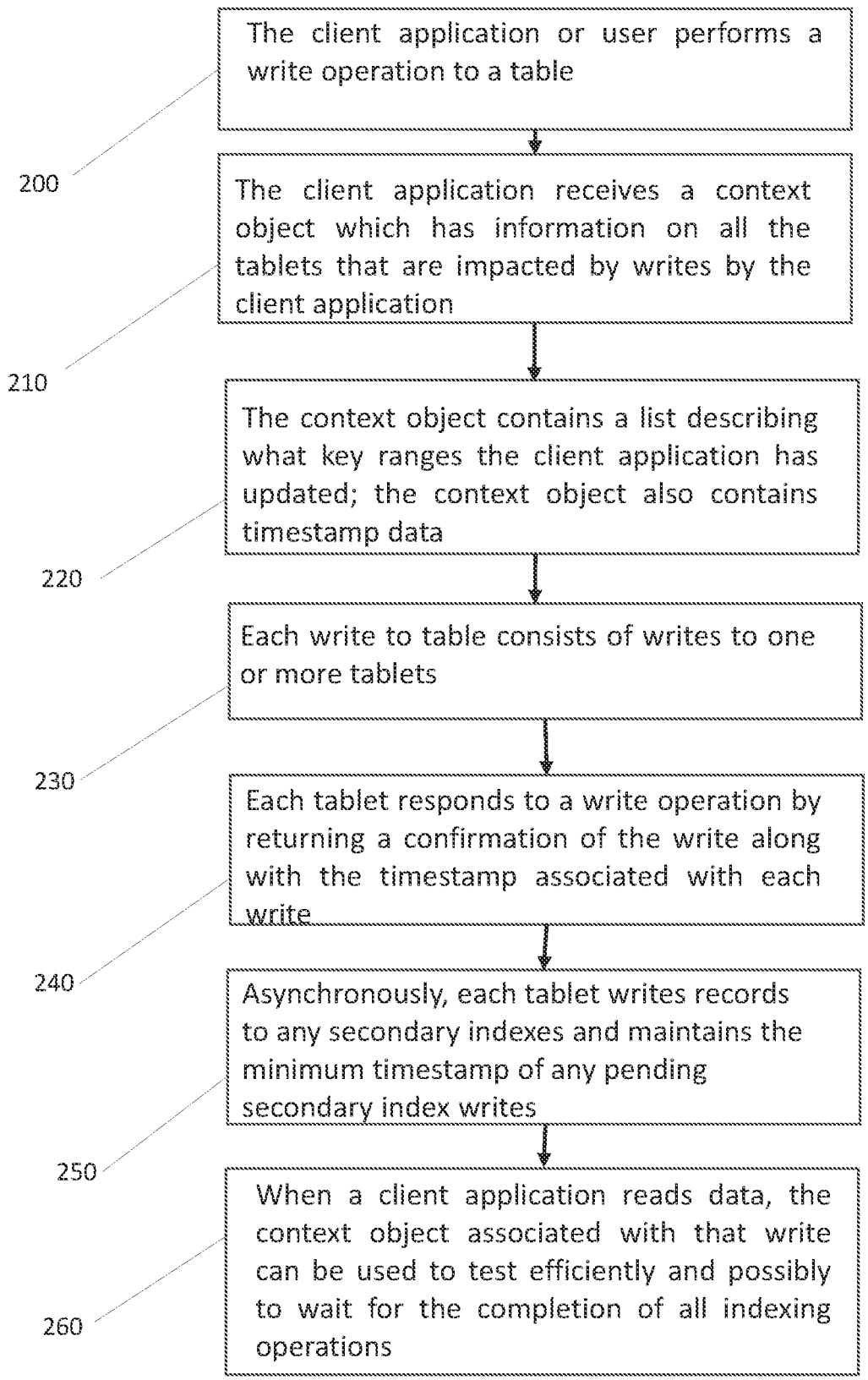
FIG. 2 is a flow diagram showing an overview of the process for reading own writes using context objects in a distributed database.

FIG. 2 is a flow diagram showing an overview of the process for reading own writes using context objects in a distributed database.

In FIG. 2:

The client application or user performs a write operation to a table (200) and receives a context object which has information on all the tablets that are impacted by writes by the client application (210).

The context object contains a list describing what key ranges the client application has updated. The context object also contains timestamp data (220).

Each write to the table consists of writes to one or more tablets (230).

Each tablet responds to a write operation by returning a confirmation of the write along with the timestamp associated with each write (240).

Each tablet writes records to any secondary indexes asynchronously and maintains the minimum timestamp of any pending secondary index writes (250).

When a client application reads data, the context object associated with that write can be used to test efficiently and possibly to wait for the completion of all indexing operations (260).

As noted, a context object has a subdivision identifier and a record of what writes were made to that subdivision by a specific user. Context objects require very little overhead with respect to storage or processing yet provide a significant advantage to users who require a guarantee and verification that secondary indexes are updated with previous writes to a primary table.

A similar mechanism can be used to track non-local replicas of the table. In such a case, each replica of any tablet would have a minimum timestamp for any pending replication to the replica of the tablet. This timestamp could be used to determine whether any data written by a client application had been replicated to the replica table. Each tablet in the replica can also record the last applied timestamp of any replication from another tablet. This allows the use of a context object to probe a replica to find out if the data written as part of the write associated with the context object has been fully propagated to the replica table.

Computer Implementation

Figure 3:
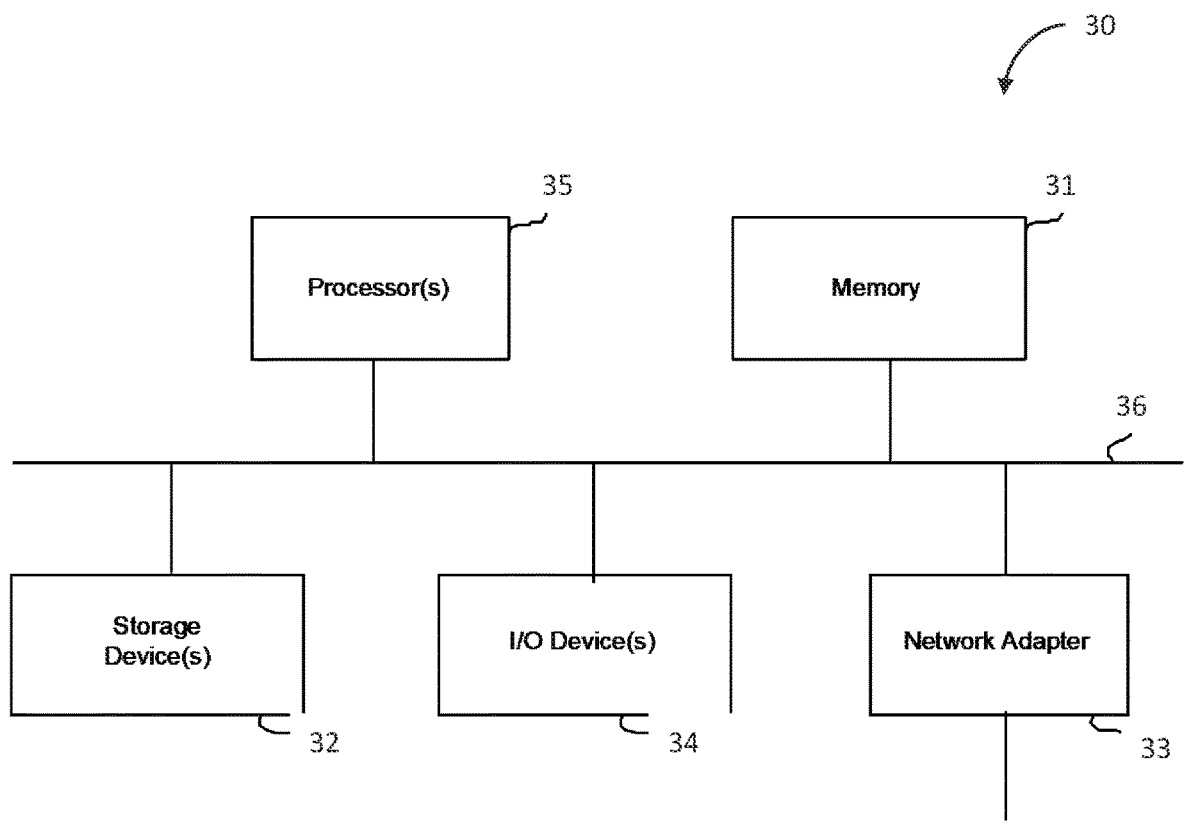
FIG. 3 is a block schematic diagram showing a machine in the example form of a computer system within which a set of instructions for causing the machine to perform one or more of the methodologies discussed herein may be executed.

FIG. 3 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 30 may include one or more central processing units ("processors") 35, memory 31, input/output devices 34, e.g. keyboard and pointing devices, touch devices, display devices, storage devices 32, e.g. disk drives, and network adapters 33, e.g. network interfaces, that are connected to an interconnect 36.

In FIG. 3, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also referred to as Firewire.

The memory 31 and storage devices 32 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 31 can be implemented as software and/or firmware to program one or more processors to carry out the actions described above. In some embodiments of the invention, such software or firmware may be initially provided to the processing system 40 by downloading it from a remote system through the computing system, e.g. via the network adapter 33.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention.

The invention claimed is:

1. A method comprising:
   requesting, by a client application, a write operation to one or more tablets associated with a table of a distributed database;
   receiving at the client application a context object associated with the write operation, wherein the context object is generated by the one or more tablets;
   subsequent to a request for the write operation, requesting, by the client application, a read operation;
   determining whether an indexing operation associated with the write operation is completed based on the context object; and
   using the context object to reduce a number of tablets of the read operation during verification of indexing operations to an intersection of tablets involved in the read operation and tablets involved in the write operation.

2. The method of claim 1, wherein the context object comprises a list describing a key range updated by the client application.

3. The method of claim 1, wherein the context object comprises timestamp data associated with a latest timestamp of an update to any of the one or more tablets.

4. The method of claim 1, wherein the context object comprises a timestamp for each key range updated by the write operation.

5. The method of claim 1, further comprising:
   receiving a confirmation of the write operation for a respective tablet and a timestamp associated with the write operation for each respective tablet of the one or more tablets.

6. The method of claim 1, further comprising:
   asynchronously writing records of a respective tablet to one or more secondary indexes; and
   maintaining a minimum timestamp of a pending secondary index write operation for the respective tablet.

7. The method of claim 6, further comprising:
   determining that the write operation has propagated to the secondary index by testing the minimum timestamp against a timestamp associated with the write operation.

8. The method of claim 1, further comprising:
   determining that an indexing operation associated with the write operation is completed based on the context object; and
   completing the read operation.

9. The method of claim 1, further comprising:
   determining that an indexing operation associated with the write operation is not completed based on the context object; and
   delaying the read operation.

10. The method of claim 1, further comprising:
    receive, from the one or more tablets, a statistical estimate of an indexing delay in the one or more tablets; and
    query the one or more tablets to determine if the write operation has been indexed, wherein the one or more tablets are queried at a time based on the time delay.

11. A system for performing write operations in a distributed database comprising:
    a processing unit; and
    a memory containing instructions that, when executed by the processing unit, cause the processing unit to:
    request, by a client application, a write operation to one or more tablets associated with a table of a distributed database;
    receive at the client application a context object associated with the write operation, wherein the context object is generated by the one or more tablets;
    subsequent to a request for the write operation, request, by the client application, a read operation;

determine whether an indexing operation associated with the write operation is completed based on the context object;
receive, from the one or more tablets, a statistical estimate of an indexing delay in the one or more tablets; and
query the one or more tablets to determine if the write operation has been indexed, wherein the one or more tablets are queried at a time based on the time delay.

12. The system of claim 11, wherein the instructions further cause the processing unit to:
pass contents of the context object to a second client application.

13. The system of claim 12, wherein the second client application uses the context object to perform a test for index currency of the one or more tablets.

14. The system of claim 11, wherein the instructions further cause the processing unit to:
request a second write operation; and
receive a second context object associated with the second write operation.

15. The system of claim 14, wherein the instructions further cause the processing unit to:
combine the context object and the second context object to test an indexing status of the write request and the second write request using a single test.

16. The system of claim 11, wherein each of the one or more tablets is associated with a replica tablet and wherein each replica tablet is associated with a minimum timestamp for a pending replication of the write operation to each replica tablet.

17. The system of claim 16, wherein the context object comprises the minimum timestamp associated with each replica tablet.

18. The system of claim 17, wherein the instructions further cause the processing unit to:
use the context object to probe each replica tablet to determine if data written as part of the write operation has been fully propagated to each replica tablet.

19. A non-transitory computer-readable medium storing code comprising instructions executable to:
request, by a client application, a write operation to one or more tablets associated with a table of a distributed database;
receive at the client application a context object associated with the write operation, wherein the context object is generated by the one or more tablets;
subsequent to a request for the write operation, request, by the client application, a read operation;
determine whether an indexing operation associated with the write operation is completed based on the context object; and
using the context object to reduce a number of tablets of the read operation during verification of indexing operations to an intersection of tablets involved in the read operation and tablets involved in the write operation.

20. The non-transitory computer-readable medium of claim 19, the instructions executable to:
receive, from the one or more tablets, a statistical estimate of an indexing delay in the one or more tablets; and
query the one or more tablets to determine if the write operation has been indexed, wherein the one or more tablets are queried at a time based on the time delay.

* * * * *